US012771928B2

(12) United States Patent
Abdelli et al.

(10) Patent No.: US 12,771,928 B2
(45) Date of Patent: Oct. 20, 2026

(54) METHOD AND SYSTEM FOR DISPLAYING AND MANAGING A SITUATION IN THE ENVIRONMENT OF AN AIRCRAFT

(71) Applicant: AIRBUS HELICOPTERS, Marignane (FR)

(72) Inventors: Kamel Abdelli, Marseilles (FR); Richard Alvarez, La Cadiere d'Azur (FR)

(73) Assignee: AIRBUS HELICOPTERS, Marignane (FR)

( * ) Notice: Subject to any disclaimer, the term of this patent is extended or adjusted under 35 U.S.C. 154(b) by 275 days.

(21) Appl. No.: 17/694,745

(22) Filed: Mar. 15, 2022

(65) Prior Publication Data

US 2022/0301441 A1 Sep. 22, 2022

(30) Foreign Application Priority Data

Mar. 22, 2021 (FR) ....................................... 2102665

(51) Int. Cl.
*H04N 23/63* (2023.01)
*G03B 15/00* (2021.01)
(Continued)

(52) U.S. Cl.
CPC ......... *H04N 23/635* (2023.01); *G03B 15/006* (2013.01); *G06F 3/011* (2013.01);
(Continued)

(58) Field of Classification Search
CPC ...... H04N 23/635; H04N 7/185; G06F 3/011; G06F 3/012; G06V 20/17; G03B 15/006;
(Continued)

(56) References Cited

U.S. PATENT DOCUMENTS 5,015,188 A 5/1991 Pellosie, Jr. et al.
8,723,696 B1 5/2014 Vanderkamp et al.
(Continued)

FOREIGN PATENT DOCUMENTS

EP 3112814 A1 1/2017
EP 3376278 A1 9/2018
(Continued)

OTHER PUBLICATIONS

French Search Report for French Application No. FR2102665, Completed by the French Patent Office, Dated Nov. 22, 2021, 11 pages.
(Continued)

*Primary Examiner* — Weiming He
(74) *Attorney, Agent, or Firm* — BROOKS KUSHMAN P.C.

(57) ABSTRACT

A method and a system for displaying and managing a situation in the environment of an aircraft. Such a system comprises a first display device, several cameras covering the external environment around the aircraft, a helmet worn by an occupant and comprising a second display device, at least one sensor measuring a position and an orientation of the helmet. This system makes it possible to determine a monitoring zone in the environment of the aircraft, then display a first image representing the monitoring zone on the first display device. Next, a center of interest is selected in the monitoring zone, after which a second image representing the center of interest is displayed on the second display device. Finally, a sighting marker is displayed indicating the center of interest.

20 Claims, 4 Drawing Sheets

(51) Int. Cl.
*G06F 3/01* (2006.01)
*G06V 20/17* (2022.01)
*H04N 7/18* (2006.01)

(52) U.S. Cl.
CPC .............. *G06F 3/012* (2013.01); *G06V 20/17* (2022.01); *H04N 7/185* (2013.01)

(58) Field of Classification Search
CPC .................. G02B 27/017; G02B 27/01; G02B 2027/0141; F41G 11/00; G01C 23/00; G01C 23/005; G06T 19/006
See application file for complete search history.

(56) References Cited

U.S. PATENT DOCUMENTS

| | | | | |
|---|---|---|---|---|
| 2014/0282267 | A1* | 9/2014 | Vogelmeier | G01S 7/20 715/852 |
| 2015/0135132 | A1* | 5/2015 | Josephson | H04W 4/021 715/784 |
| 2017/0003838 | A1 | 1/2017 | Cazaux et al. | |
| 2017/0053453 | A1 | 2/2017 | Andre et al. | |
| 2018/0356884 | A1* | 12/2018 | Lee | H04S 3/008 |
| 2019/0301837 | A1* | 10/2019 | Gold | G06F 16/29 |
| 2020/0183154 | A1* | 6/2020 | Lafon | G02B 27/0149 |

FOREIGN PATENT DOCUMENTS

| | | | | |
|---|---|---|---|---|
| FR | 3057685 | A1 * | 4/2018 | G02B 27/017 |
| JP | 2017107535 | A * | 6/2017 | G05D 1/0038 |
| WO | 2015005849 | A1 | 1/2015 | |
| WO | 2015165838 | A1 | 11/2015 | |

OTHER PUBLICATIONS

"Eurofl'Eye™—Ultra-wide piloting aid sensor for helicopter". https://www.safran-group.conn/products-services/euroflevetm. 9 pages.

* cited by examiner

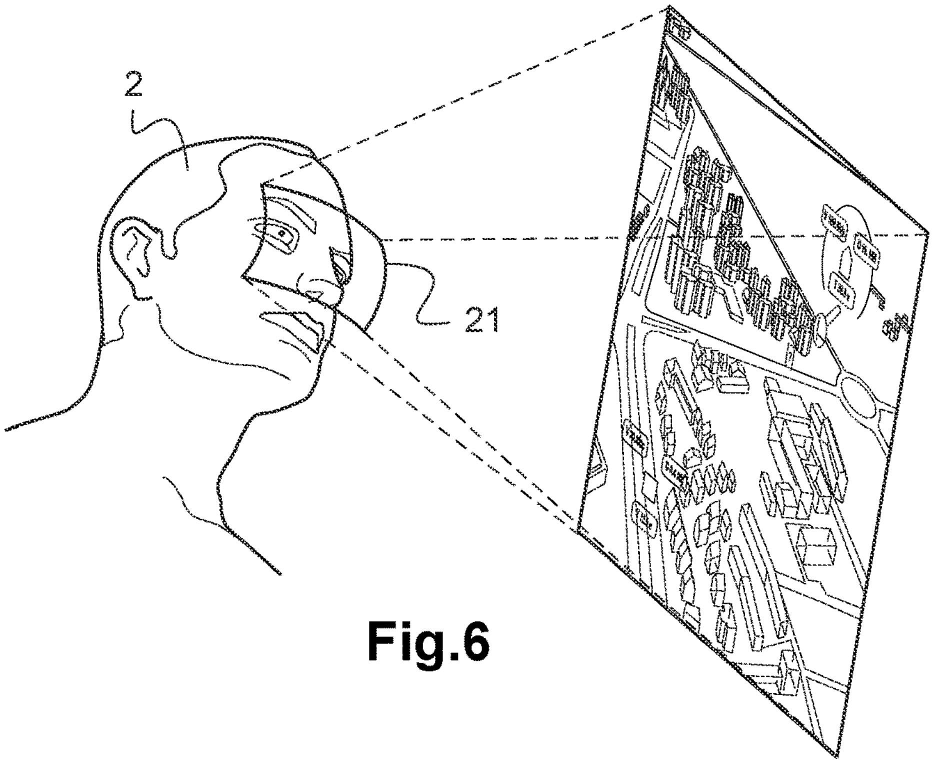
Fig.6
Fig.7
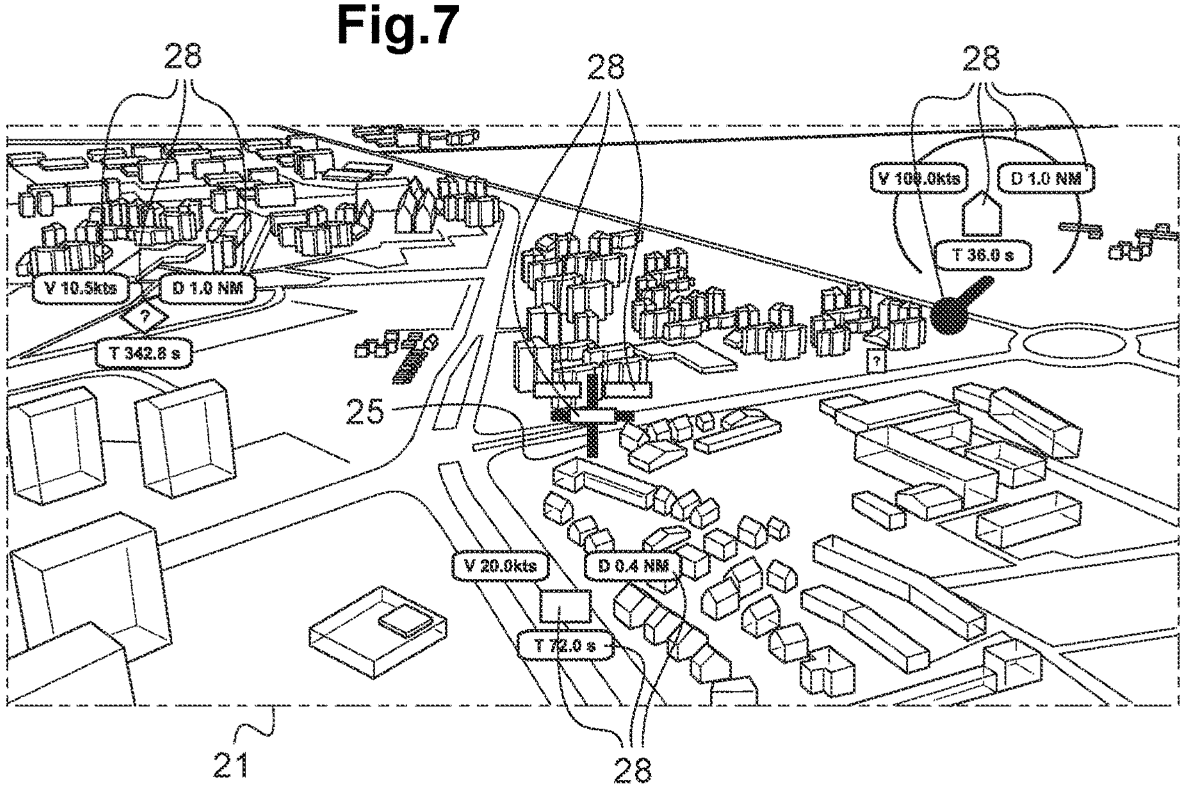

METHOD AND SYSTEM FOR DISPLAYING AND MANAGING A SITUATION IN THE ENVIRONMENT OF AN AIRCRAFT

CROSS REFERENCE TO RELATED APPLICATIONS

This application claims priority to French patent application No. FR 21 02665 filed on Mar. 22, 2021, the disclosure of which is incorporated in its entirety by reference herein.

TECHNICAL FIELD

The present disclosure belongs to the field of human-machine interfaces of a crew member of an aircraft.

The present disclosure relates to a method and a system for displaying and managing a situation in the environment of an aircraft.

BACKGROUND

A known human-machine interface of an aircraft allows information to be supplied to an occupant of this aircraft, for example the captain, a navigator or a gun operator. Such a human-machine interface also enables this occupant to process this information and/or to control actions of the aircraft, for example.

For the sake of simplification, only the term “occupant” will be used hereinafter to designate the pilot, the captain, a navigator, a gun operator or any passenger of an aircraft in the context of the disclosure.

A situation in the environment of an aircraft may include information relating to this environment of the aircraft and may be displayed on one or more screens integrated into the aircraft instrument panel. The arrival of new technologies has made it possible to present this directly on a visor of the occupant’s helmet, possibly in color and in high definition. A display system integrated into a helmet of an occupant of an aircraft may be referred to by the acronym HMD, standing for “Helmet Mounted Display”, or HMSD, standing for “Helmet Mounted Sight & Display”. Such a display system may, for example, include a transparent screen or a transparent surface on which information or images may be projected.

Furthermore, such a situation in the environment of an aircraft may be presented as an overlay on the environment outside the aircraft or on an image of this outside environment. This situation in the environment of an aircraft may be presented in a two-dimensional or three-dimensional form.

For example, document U.S. Pat. No. 5,015,188 describes a device and a method for presenting a situation in the environment of an aircraft. In particular, this method makes it possible to display, on a screen that may be integrated into a helmet of an operator or a pilot, several perspective views representing the aircraft and one or more objects surrounding it in a three-dimensional space. The aircraft may be shown in the center of the view, surrounded by one or more objects. The displayed positions of the one or more objects automatically change in response to the rotation and/or the movement of the aircraft in order to maintain a constant orientation of each view. Concentric circles and radial lines may be displayed in order to indicate relative distances between the aircraft and one or more objects. A view resembling a real view of an operator situated in the aircraft can also be shown.

In addition, document U.S. Pat. No. 8,723,696 describes a device and a method for displaying two images relating to the environment of an aircraft, one referred to as a “tactical” image and one referred to as a “strategic” image, on the same screen or on two separate screens. A point of interest may be selected, for example, by means of its coordinates, or directly on the displayed tactical image by pressing a touch screen on an ad hoc basis. The tactical image and the strategic image are then updated by adding information relating to the selected point of interest and optionally by zooming in on the selected point of interest. The tactical image and the strategic image can be displayed from different points of view, one being a perspective view, for example, and the other a plan view.

Document WO 2015/005849 discloses a system and a method for processing information relating to the environment of a combat vehicle overlaid on images representing the external environment of that vehicle. The displayed information is stored in a module of the vehicle and includes, for example, the position and type of an object in the environment.

Document FR 3 057 685 describes methods for designating and displaying information and a display system for an aircraft. The display system comprises at least two screens, for example a screen on an instrument panel of the aircraft and a screen integrated into a helmet of an occupant of the aircraft, as well as a designation device for selecting an object in the environment, via its representation on one of the two screens.

The designation device may be a touch panel associated with a screen, a pointer moved by means of a mouse, for example, or a system for determining the orientation of the line of sight of the gaze of an occupant of the aircraft. For each object selected on one screen, a symbol is displayed overlaying or close to the object on another screen, possibly along with information relating to the object.

In addition, in an aircraft, the field of view of an occupant towards the outside of this aircraft may be limited and reduced by various structural elements, such as a floor, a ceiling, doors, or uprights carrying at least one transparent surface. Moreover, it is not possible to directly view the environment behind the aircraft.

This limitation of the field of view towards the outside may be inconvenient for an occupant of an aircraft in certain situations, for example when close to obstacles.

Such a limitation of the field of view towards the outside may also be problematic for a rotary-wing aircraft, also referred to as a “rotorcraft”, which has the particular feature of being able to move in all directions, namely longitudinally forwards and backwards, vertically upwards and downwards, or indeed laterally.

It can therefore be advantageous to have a complete view of the environment close to an aircraft in order to have complete knowledge of the situation of the vehicle with respect to its environment and, in particular, knowledge of the obstacles that are potentially close to this vehicle and situated outside the field of view of this occupant towards the outside.

Vision assistance systems exist and use cameras arranged outside the aircraft to obtain a complete view of the environment of the aircraft. Moreover, such vision assistance systems may also include amplification or filtering devices for improving vision at night or in bad weather, for example.

Furthermore, document EP 3 376 278 discloses a display device integrated into the helmet of an occupant of an aircraft and making it possible to display a field of view that is offset with respect to the orientation of this helmet. This means the occupant can have a view through this display device representing the external environment offset with respect to the orientation of his or her head. Images of this external environment are captured by means of cameras positioned on the aircraft. For example, when a line of sight of the occupant is shifted by an offset angle relative to the longitudinal direction of the aircraft, the offset of images of the external environment is proportional to this offset angle of the line of sight.

The technological background of the disclosure also includes documents EP 3 112 814, WO 2015/165838 and US 2020/183154.

SUMMARY

An object of the present disclosure is therefore to overcome the above-mentioned limitations by proposing an alternative human-machine interface for an aircraft that makes it possible to display and manage a situation in the environment of the aircraft.

An object of the present disclosure is to provide a method and a system for displaying and managing a situation in an environment of an aircraft as described in the claims.

An object of the present disclosure is, for example, a method for displaying and managing a situation in an environment of an aircraft, the aircraft comprising, in particular, image capture devices for capturing images of the environment of the aircraft, at least one calculator, at least one receiving device, at least one first display device arranged inside a cockpit of the aircraft, at least one second display device intended to be positioned at the head of an occupant of the aircraft, at least one sensor inside the aircraft in order to determine a position and an orientation of the head of the occupant of the aircraft with respect to the aircraft, a selection device and a system for tracking the aircraft.

The image capture devices are oriented towards the outside of the aircraft and thus make it possible to capture images of the environment outside the aircraft that are free of obstacles, unlike the view of this external environment of each occupant located inside the aircraft, which may in particular be hindered by structural elements of the aircraft or an instrument panel, for example. The image capture devices may, for example, be positioned partially outside the aircraft.

These image capture devices may be arranged so as to capture images that together cover the entire external environment in which the aircraft is travelling, namely 360° about a vertical axis and 360° about a horizontal axis of the vehicle. The image capture devices therefore make it possible to acquire images of the environment covering, for example, a sphere around the aircraft.

The at least one first display device may be a screen arranged in a cockpit of the aircraft, for example on an instrument panel of the aircraft or on a console of the aircraft. The at least one first display device may also be a part of the windshield of the aircraft on which an image is projected and whose opacity may be modified.

The at least one second display device is intended to be positioned at the head of an occupant, for example in front of the eyes of the occupant. The at least one second display device may be integrated into a helmet of an occupant of the aircraft and may comprise a transparent screen integrated into the helmet, and into the visor of the helmet, for example. The at least one second display device may also be all or part of the transparent visor of the helmet on which an image is projected and whose opacity may be modified. The at least one second display device may also be integrated into a pair of spectacles.

The calculator may comprise at least one processor and at least one memory, at least one integrated circuit, at least one programmable system or indeed at least one logic circuit, these examples not limiting the scope given to the expression "calculator". The calculator may be a calculator dedicated to carrying out the method according to the disclosure or may be a shared calculator having multiple functions. The memory may, for example, store one or more terrain databases, as well as one or more algorithms for implementing the method according to the disclosure.

The at least one receiving device allows various information to be received via a wireless link. This information may comprise, for example, coordinates of points in the environment or information on the objects in the environment, such as buildings and vehicles in particular, especially their positions in the terrestrial reference frame and their speeds, if applicable.

The tracking system of the aircraft may include, for example, a satellite tracking system.

The method for displaying and managing a situation in an environment of an aircraft according to the disclosure is remarkable in that it comprises the following steps:

determining a monitoring zone in the environment of the aircraft;

displaying a first image representing the monitoring zone on the first display device;

selecting, on the first display device, a center of interest in the monitoring zone, by means of a selection device;

displaying a second image representing the center of interest on the second display device; and displaying a sighting marker pointing to the center of interest on the second image.

The method according to the disclosure thus makes it possible, after identifying a monitoring zone in the environment of the aircraft, to select a center of interest in the monitoring zone in order to display it on the second display device. In this way, this occupant of the aircraft, who may be the pilot of the aircraft, the captain, a navigator or a gun operator, has a view focused on an identified center of interest in the monitoring zone on the second display device.

The center of interest may be a single point and thus constitute a point of interest. For example, the center of interest may be positioned on a building or a vehicle situated in the monitoring zone. The center of interest may also be a part of the monitoring zone in which there are, for example, several buildings or vehicles likely to be of interest.

This method according to the disclosure thus makes it possible to provide at least one occupant of the aircraft with an optimized view of the situation and/or of the positioning of the aircraft with respect to a specific center of interest.

During the step of determining a monitoring zone in the environment of the aircraft, the monitoring zone may be determined by a selection made by an occupant of the aircraft, by means of the selection device, on the first display device, the first display device displaying an image representing the environment of the aircraft in the form of an aerial view. The selection device may comprise a touch panel integrated into the first display device, a joystick, a mouse or any appropriate selection means connected to the calculator.

The image representing the environment of the aircraft in the form of an aerial view may be constructed from information from a terrain database, stored in a memory of the calculator, for example, or else from information from a remote terrain database, received by means of a receiving device of the aircraft. The image representing the environment of the aircraft may also be derived in whole or in part from an image captured and transmitted by another aircraft or a satellite, for example. This image representing the environment of the aircraft may also be constructed, by the calculator or by a dedicated calculator, from the images captured by the image capture devices of the aircraft and flattened into an aerial view.

During the step of determining a monitoring zone in the environment of the aircraft, the monitoring zone can also be determined from a zone of the external landscape present in the field of view of an occupant of the aircraft. This zone of the external landscape that is viewed is characterized, for example, by a specific direction defined, for example, by a bearing and an elevation in a terrestrial reference frame. For example, the monitoring zone is centered on this specific direction and may have predetermined dimensions.

The bearing is the angle formed between a longitudinal direction of the aircraft and this specific direction of the zone of the external landscape that is viewed projected on a horizontal plane of the terrestrial reference frame. The elevation is the angle between this longitudinal direction of the aircraft and this direction of the zone of the external landscape that is viewed, projected on a vertical plane of the terrestrial reference frame passing through this longitudinal direction. A horizontal plane of a terrestrial reference frame is a plane perpendicular to the direction of the Earth's gravity and a vertical plane of this terrestrial reference frame is a plane parallel to the direction of the Earth's gravity.

This occupant of the aircraft can observe the landscape directly through the second display device, which is therefore transparent or semi-transparent, and the direction of the zone that is viewed can thus be determined from the position and orientation of the head of this occupant with respect to the aircraft, using the at least one sensor arranged inside the aircraft, as well as the tracking system of the aircraft determining the position and orientation of the aircraft in the terrestrial reference frame.

This occupant of the aircraft can also observe a representation of the landscape by means of a view displayed on the second display device. This view may be constructed by the calculator or by a dedicated calculator, for example from the images captured by the image capture devices of the aircraft. This view may be a conformal view of the landscape, i.e., equivalent to a direct view of the landscape, or else an offset and/or distorted view of the landscape. The calculator or the dedicated calculator constructs this view from the images captured by the image capture devices of the aircraft, the position and orientation of the head of the occupant and the position and orientation of the aircraft in the terrestrial reference frame. Therefore, during this construction, this calculator determines the direction of the zone of the external landscape that is viewed by this occupant and therefore its bearing and its elevation.

During the step of determining a monitoring zone in the environment of the aircraft, the monitoring zone may also be determined by receiving the coordinates of the monitoring zone via a receiving means of the aircraft. These coordinates of the monitoring zone may be provided by another vehicle, such as an aircraft or a ship, or by a ground base, for example.

During the step of displaying a first image representing the monitoring zone, this first image displayed on the first display device may be represented in the form of an aerial view.

This first image may be constructed from information from a terrain database, stored in a memory of the calculator, for example, or else from information received in real time by means of the receiving device of the aircraft from a remote terrain database. This first image may also be derived in whole or in part from an image captured and transmitted by another aircraft or a satellite, for example. This first image may also be constructed, by the calculator or by a dedicated calculator, from the images captured by the image capture devices of the aircraft and flattened into an aerial view.

Moreover, during the step of selecting the center of interest, the selection device makes it possible to select the center of interest, but also to manipulate the first image, for example in order to enlarge the first image, rotate the image or move the first image in order to display a part of the environment situated outside the initially displayed first image. The selection device may be the same as that possibly used during the step of determining a monitoring zone in the environment of the aircraft.

A center of interest that is a single point constituting a point of interest may be selected by the selection device by pointing to this point of interest on the first display device. The sighting marker displayed during the step of displaying a sighting marker then indicates this point of interest.

A center of interest formed by a part of the monitoring zone may be selected by the selection device by defining a frame on the first display device by means of the selection device. In this case, the marker displayed during the step of displaying a sighting marker then indicates the center of this part of the monitoring zone.

In this case, the method according to the disclosure may also include an additional step of selecting a point of interest in this part of the monitoring zone by means of the second display device and an auxiliary selection device. The sighting marker then indicates the selected point of interest.

During the step of displaying a second image representing the center of interest, the second image may be constructed from information from a terrain database, stored in a memory of the calculator, or else from information received in real time by means of the receiving device of the aircraft from a remote terrain database, for example.

The second display device may then be opaque, the occupant not directly distinguishing the landscape outside the aircraft through the second display device. This second image is then displayed irrespective of the position and orientation of the head of the occupant.

According to another possibility, the second display device may be transparent or semi-transparent, the occupant being able to directly see the landscape outside the aircraft, transparently, through the second display device. The second image is then displayed overlaying the real landscape, taking into account the position and orientation of the head of the occupant.

The second image may also be constructed, by the calculator or by a dedicated calculator, from the images captured by the image capture devices of the aircraft. This second image is then displayed irrespective of the position and orientation of the head of the occupant. The second image may include a non-distorted central view of a first part of the environment outside the aircraft and a distorted peripheral view of a second part of the environment outside the aircraft, the peripheral view being situated around the central part. The first part of the environment outside the aircraft comprises, in particular, the center of interest, while the second part of the environment outside the aircraft is situated around the first part.

The first part and the second part of the environment outside the aircraft may cover the whole of the environment around the aircraft such that the first part and the second part of the environment cover a sphere fully surrounding the aircraft. This provides the occupant with a 360° view all around the aircraft without moving his or her head, the second part being displayed in a deformed manner, however.

The second image may be displayed on the second display device in two-dimensions or else in three-dimensions.

Furthermore, during this step of displaying the second image, the second image is modified following a movement of the head of the occupant, as a function of the movements of the head of the occupant, and changes in the position and orientation of the head of the occupant. To this end, the step of displaying the second image may comprise a sub-step of determining the position and orientation of the head of the occupant following a movement of the head of the occupant in order to characterize the movement of the head of the occupant, and a sub-step of calculating a new second image as a function of the position and orientation of the head of the occupant and based on the images of the environment of the aircraft captured by the image capture devices.

In addition, following the step of displaying a sighting marker indicating the center of interest, a movement of the helmet can produce an equivalent movement of the sighting marker on the second image. The movement of the sighting marker follows the movement of the head of the occupant, meaning that the sighting marker no longer indicates the center of interest.

Furthermore, the method according to the disclosure may include additional steps. For example, the method according to the disclosure may include a first additional step of displaying information relating to the monitoring zone on the first image. According to another example, the method according to the disclosure may include a second additional step of displaying information relating to the center of interest and possibly to the environment in the vicinity of the center of interest on the second image. This information may be of different types and make it possible to identify the nature of buildings or vehicles, for example. This information may also provide a distance, an identity, an alert level and, possibly, a speed of identified objects, in the form of a speed vector including the direction and value of this speed of the identified objects. This information may be transmitted by another aircraft or a ground base, via known communication protocols, and is received by means of a receiving device of the aircraft.

The method according to the disclosure thus makes it possible to detect, recognize and identify objects in the environment of the aircraft with coverage of the environment all around the aircraft. The method according to the disclosure also makes it possible to focus in particular on centers of interest likely to be present in the environment of the aircraft.

The method according to the disclosure may also include the following two additional steps:

slaving a movable member pointing to the sighting marker; and locking the movable member on the sighting marker by means of a locking device.

This movable member is preferably arranged on the aircraft. A movable member may, for example, be a spotlight, a water cannon or indeed any element or equipment allowing a point-to-point association with the position indicated by the sighting marker, and in particular the selected point of interest.

The locking device may, for example, comprise a push-button arranged on the instrument panel of the aircraft or on a control lever of the aircraft. Following this locking step, a movement of the helmet of the occupant no longer results in movement of the sighting marker, which is then directed towards the same point of the environment regardless of the movements of the helmet.

Finally, the method according to the disclosure may include a step of activating the movable member towards the locked sighting marker. For example, the movable member is directed towards the center of interest if no movement of the helmet of the occupant has taken place following the step of displaying the sighting marker.

The present disclosure also relates to a system for displaying and managing a situation in the environment of an aircraft. Such a system comprises image capture devices for capturing images of the environment of the aircraft, at least one calculator, at least one receiving device, at least one first display device arranged inside a cockpit of the aircraft, at least one second display device intended to be positioned at the head of an occupant of the aircraft, at least one sensor arranged inside the aircraft in order to determine a position and an orientation of the head of the occupant with respect to the aircraft and a system for tracking the aircraft in a terrestrial reference frame.

This system for displaying and managing a situation in the environment of the aircraft is configured to implement the method described above.

The present disclosure also relates to an aircraft comprising such a system for displaying and managing a situation in the environment of an aircraft.

BRIEF DESCRIPTION OF THE DRAWINGS

The disclosure and its advantages appear in greater detail in the context of the following description of embodiments given by way of illustration and with reference to the accompanying figures, in which:

FIG. 6 is a view showing the head of an occupant and the second display device; and FIG. 7 is a view of the display on the second display device.

DETAILED DESCRIPTION

Elements that are present in more than one of the figures are given the same references in each of them.

Figure 1:
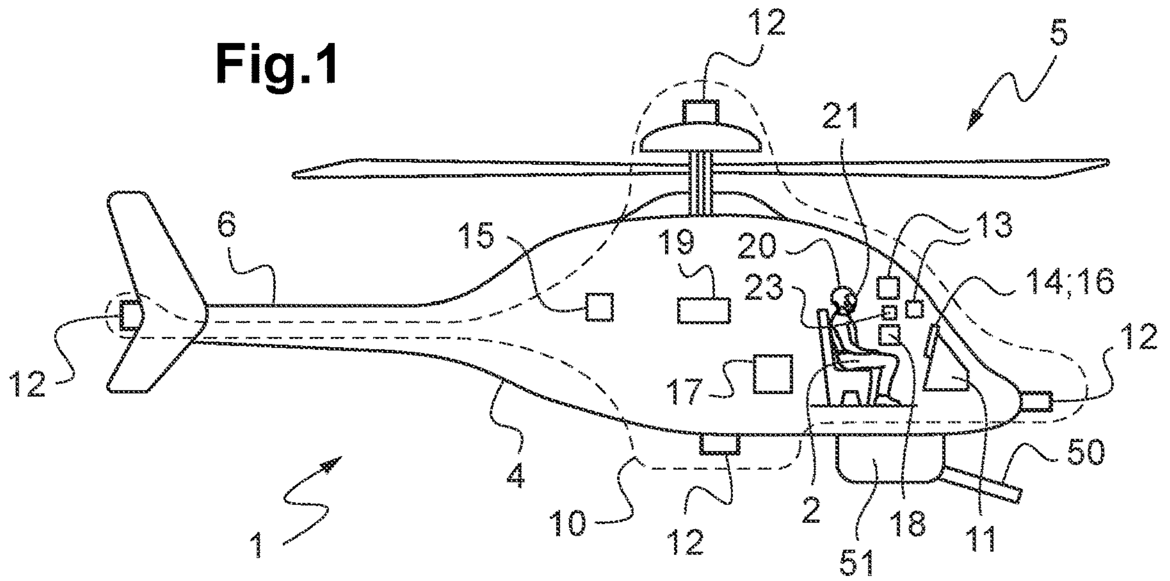
FIG. 1 is a side view of an aircraft.

FIG. 1 shows an aircraft 1 comprising a system 10 for displaying and managing a situation in the environment of the aircraft 1. The aircraft 1 shown in FIG. 1 is a rotorcraft comprising, for example, a fuselage 4, a tail boom 6 and a main lift rotor 5. However, other types of aircraft 1, such as a fixed-wing aircraft, or indeed other types of vehicles, such as a ship or a automotive vehicle, for example, may comprise such a system 10.

The system 10 for displaying and managing a situation in the environment of the aircraft 1 comprises at least one calculator 19, image capture devices 12 for capturing images of the environment of the aircraft 1, at least one sensor 13 arranged in the aircraft 1, at least one receiving device 17, at least one first display device 14 arranged inside the aircraft 1, at least one second display device 21 intended to be positioned at the head of an occupant 2 of the aircraft 1 and a system 15 for tracking the aircraft 1 in a terrestrial reference frame.

The occupant 2 may be a pilot, a co-pilot, the captain, a navigator, or a gun operator of the aircraft 1, for example.

The at least one sensor 13 is configured to determine the position and orientation of the head of the occupant 2 in the aircraft 1.

Two sensors 13 are shown secured to the aircraft 1 according to FIG. 1. However, a single sensor 13 may be sufficient to determine the orientation and position of the helmet 20 in the aircraft 1. Similarly, more than two sensors 13 may be used to determine the orientation and position of the helmet 20 in the aircraft 1. One or more sensors 13 may also be positioned on the helmet 20 and cooperate with one or more sensors 13 securely fastened to the cockpit of the aircraft 1. Such a sensor 13 may be magnetic, optical and/or inertial. Such a sensor 13 is known as a head tracker.

For example, in the case of a magnetic sensor 13, a set of coils is arranged, for example, in the cockpit of the aircraft 1 and produce a magnetic field. A magnetic sensor is mounted on the helmet 20 and detects changes in the magnetic field sensed during movements of the head of the occupant 2, and thus makes it possible to determine the position and orientation of the head.

In the case of an optical sensor 13, one or more optical transmitters are, for example, fastened to the helmet 20. One or more sensors are positioned in the cockpit of the aircraft 1 and detect the beam emitted respectively by each transmitter, allowing the position and orientation of the head of the occupant 2 to be deduced therefrom. Conversely, each optical transmitter may be fastened in the cockpit of the aircraft 1 and each sensor is positioned on the helmet 20.

The tracking system 15 makes it possible to provide the position and possibly the speed of the aircraft 1. The tracking system 15 is, for example, a satellite tracking device.

The at least one data receiving device 17 makes it possible to receive information about objects, such as buildings and vehicles. In particular, the at least one receiving device allows various information to be received via a wireless link, for example at high frequencies. This information may comprise, for example, coordinates or information on objects in the environment, such as buildings and vehicles in particular, especially their positions in the terrestrial reference frame and their speeds, if applicable.

The image capture devices 12 for capturing images of the environment of the aircraft 1 are positioned so as to capture images that together cover the whole of external environment around the aircraft 1. These image capture devices 12 can capture images in the visible and/or infrared range, in particular. For example, the peripheral vision system 10 according to the disclosure may include six image capture devices 12, such as cameras.

For example, four image capture devices 12 may be arranged on a horizontal plane and located respectively at the front tip of the fuselage 4 of the aircraft 1, at the rear of the tail boom 6, on the right-hand side and on the left-hand side of the aircraft 1. Two image capture devices 12 may also be arranged, for example, on a vertical plane, and positioned respectively above the main rotor 5 and below the fuselage 4.

Each image capture device 12 is connected to the calculator 19 or to a dedicated calculator in order to transmit to it the images captured of the environment outside the aircraft 1. The calculator 19 or the dedicated calculator can then construct a complete image of the environment outside the aircraft 1, possibly in the form of a complete sphere.

The calculator 19 or the dedicated calculator may optionally be integrated into an avionics system of the aircraft 1.

The at least one first display device 14 arranged inside the aircraft 1 may comprise a screen arranged on an instrument panel 11 of the aircraft 1 or else on a console of the aircraft 1. A first display device 14 may in particular be a screen provided with a touch panel constituting a selection device 16 that can be used by the occupant 2. A selection device 16 that can be used by the occupant 2 may also be a joystick, a mouse or any suitable selection means connected to the calculator 19.

The at least one second display device 21 is, for example, integrated into the helmet 20 worn by an occupant 2 of the aircraft 1 and may comprise a screen integrated into a visor of this helmet 20 or be the visor of this helmet 20 on which an image is projected. The at least one second display device 21 may also be integrated into a pair of spectacles worn by the occupant 2.

A second display device 21 may be transparent or semi-transparent, allowing the occupant 2 to see the environment around him or her through this second display device 21, possibly overlaid on a displayed image. A second display device 21 can also be rendered opaque so that the occupant 2 sees only the displayed image and does not see the environment around him or her. The display device 21 can also be retractable, so as to allow the occupant 2 to retract it in order to have a direct view of the environment around him or her.

The aircraft 1 also comprises a movable member 50 arranged on a turret 51 fastened under the fuselage 4 of the aircraft 1. The turret 51 is used to move the movable member 50 relative to the fuselage 4 and to orient the movable member 50 in a desired direction.

Figure 2:
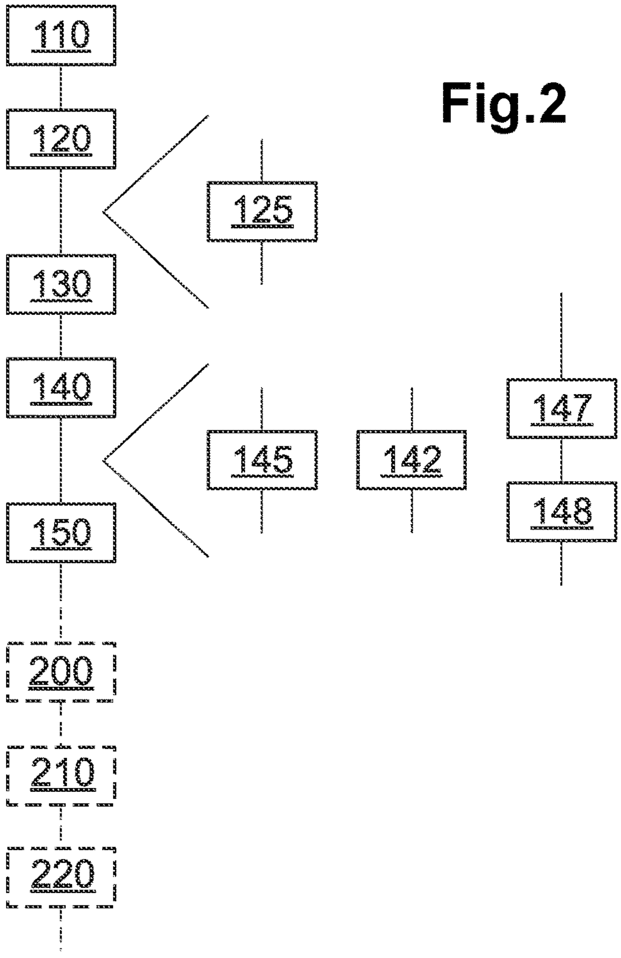
FIG. 2 is an overview diagram of the method according to the disclosure.

The calculator 19 may comprise at least one memory storing instructions for implementing a method for displaying and managing a situation in the environment of the aircraft 1, a block diagram of which is shown in FIG. 2.

Figure 3:
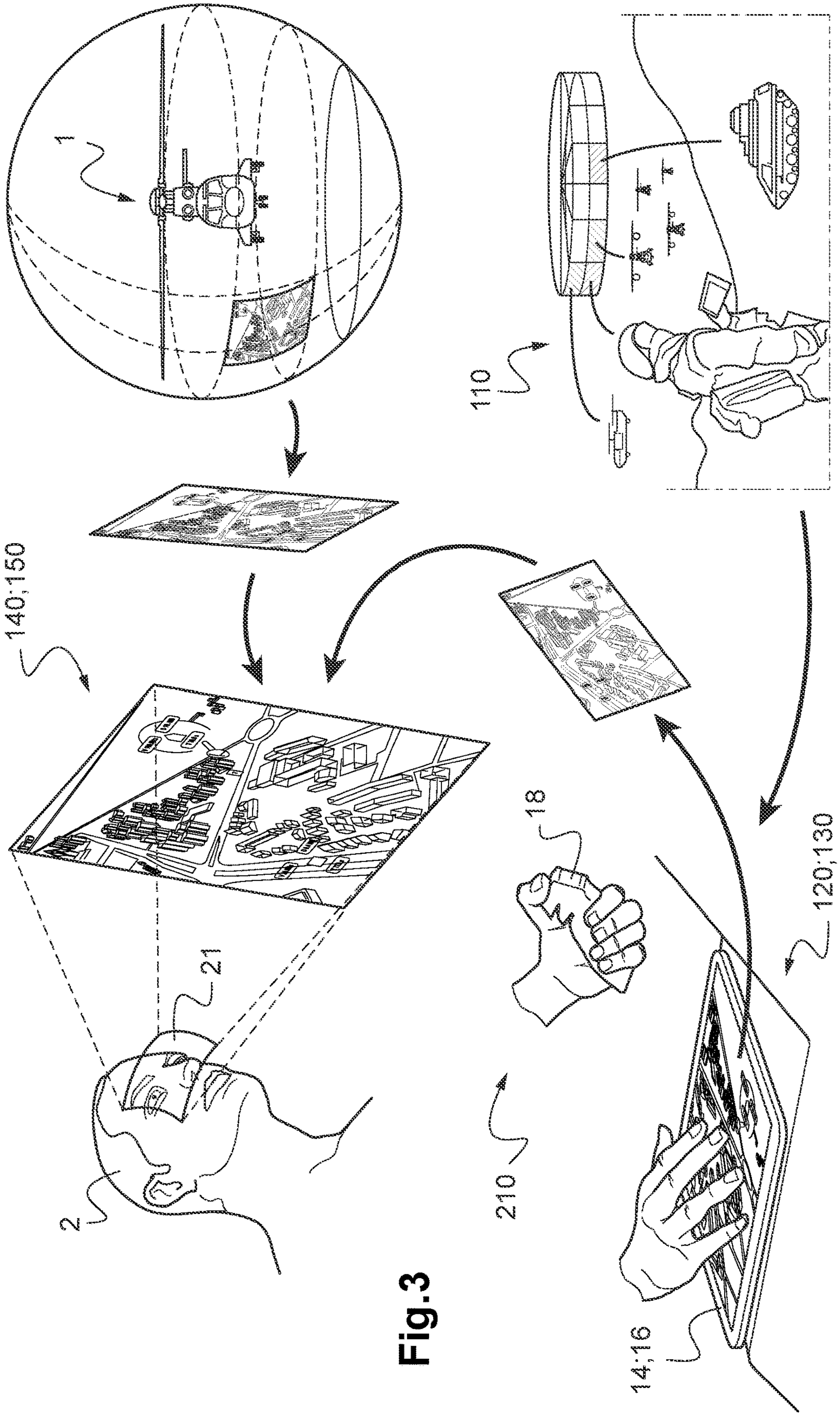
FIG. 3 is an overall view of the method.

FIG. 3 is an overall view showing the various steps of this method.

This method comprises the following steps.

Firstly, a step 110 of determining a monitoring zone in the environment of the aircraft 1 is performed.

This monitoring zone may be determined by an occupant of the aircraft 1 by means of the selection device 16, by selecting it on the first display device 14, the first display device 14 displaying an image representing the environment of the aircraft 1, for example in the form of an aerial view.

This monitoring zone may also be determined via a zone of the external landscape viewed by an occupant 2 of the aircraft 1. The monitoring zone is then centered on the zone that is viewed, and has predetermined dimensions. For example, the monitoring zone may be a circle centered on the zone that is viewed and may have a radius equal to one or several hundred meters.

This monitoring zone may also be determined by receiving the coordinates of the monitoring zone via the receiving device 17. These coordinates are, for example, sent by an operator located outside the aircraft 1, as shown in FIG. 3.

Next, a step 120 of displaying a first image representing the monitoring zone on the first display device 14 is performed.

The monitoring zone may be displayed on the first display device 14 in the form of an aerial view.

The first image may be constructed from information received in real time by means of the receiving device 17 of the aircraft 1, from a ground base, another aircraft or a satellite, for example. The first image may also be constructed from information contained in a terrain database stored in a memory of the calculator 19. This first image may also be constructed by the calculator 19 from the images captured by the image capture devices 12.

Figure 4:
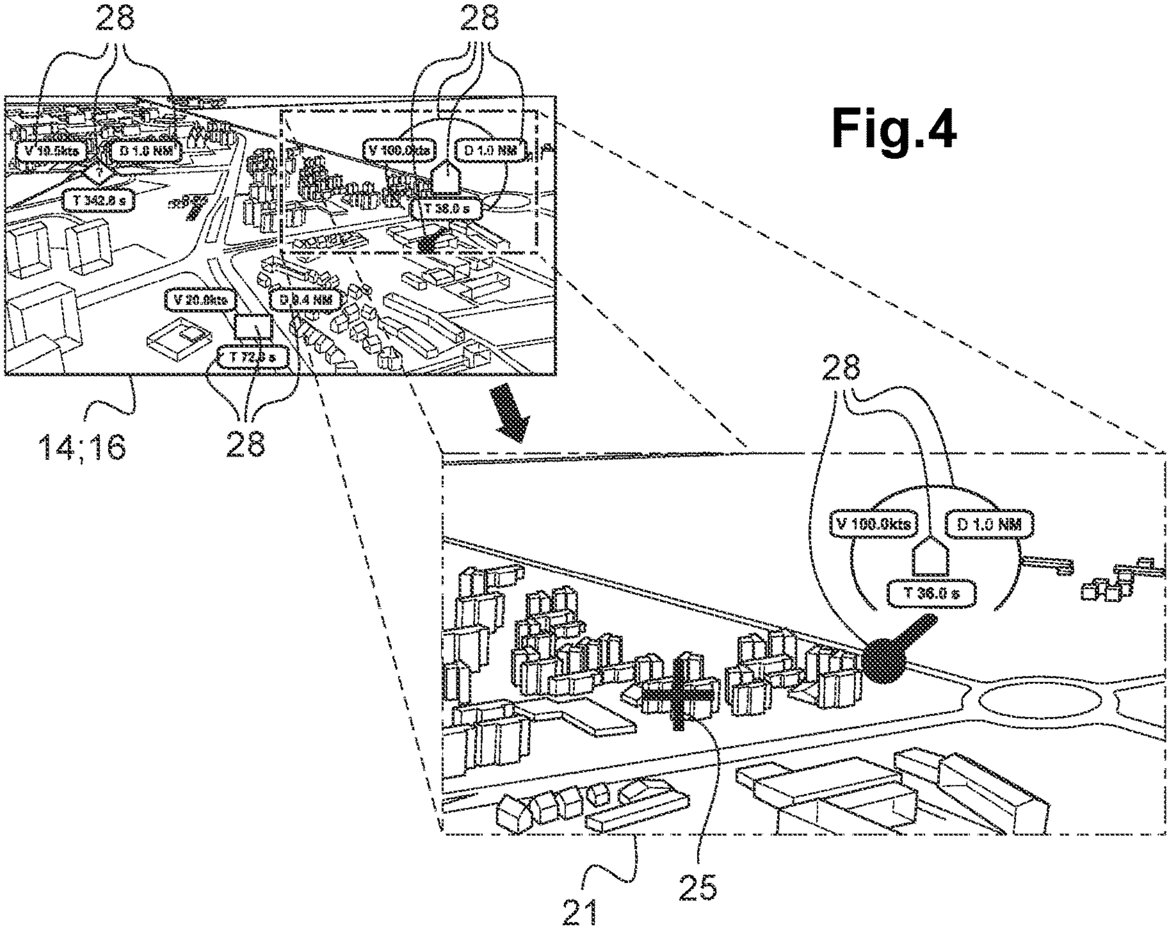
FIG. 4 is a view of the first display device.

The occupant 2 can thus view a first image limited to the monitoring zone on a first display device 14, on the instrument panel 11 or on a console, as shown in FIG. 4. His or her view is not disturbed by elements outside the monitoring zone and can therefore concentrate essentially on the monitoring zone.

Moreover, the method according to the disclosure may include a first additional step 125 of displaying information 28 relating to the monitoring zone on the first image. This information 28 may be of different types and make it possible to identify the nature of buildings or vehicles, for example. This information 28 may be contained in a database stored in a memory of the calculator 19 and/or received by the receiving device 17.

A step 130 of selecting a center of interest in the monitoring zone on the first display device 14 can then be performed by means of a selection device 16. This selection step 130 is performed by an occupant 2 of the aircraft 1.

In order to facilitate this selection of a center of interest, the occupant 2 can advantageously manipulate the first image by means of the selection device 16. For example, the first image may be enlarged, reduced, moved and/or rotated.

Figure 5:
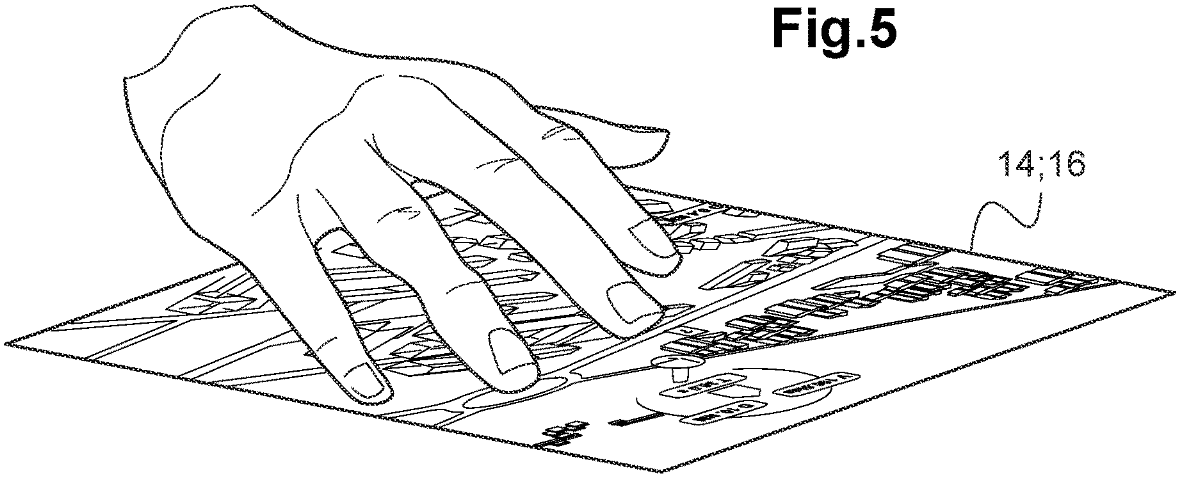
FIG. 5 is a view showing the selection of the center of interest on the first display device.

When the selection device 16 is a touch panel integrated into the first display device 14, the occupant 2 can manipulate the first image and select the center of interest with his or her hand, as shown in FIG. 5.

Then, a step 140 of displaying a second image representing the center of interest on the second display device 21 is performed. In this way, the occupant 2 wearing the helmet 20 has a view advantageously limited to this center of interest and possibly to the zone surrounding this center of interest by means of the second display device 21, as shown in FIG. 6.

The selected center of interest may be a part of the monitoring zone. In this case, the occupant 2 can define a frame by means of the selection device 16 on the first image displayed on the first display device 14, this frame defining the part of the monitoring zone and thus the selected center of interest. During the display step 140, the second image is then limited to this frame defining the selected center of interest, as shown in FIG. 4.

The selected center of interest may be a point selected by means of the selection device 16 on the first image displayed on the first display device 14 and then constituting a point of interest. During the display step 140, the second image then comprises the selected center of interest positioned at the center of the second image and the zone situated around this center of interest in the environment of the aircraft 1. The dimensions of the zone situated around this center of interest are, for example, predetermined.

The dimensions of the zone situated around this center of interest may, for example, correspond to a circle with a radius equal to 100 meters and centered on the center of interest. When the center of interest is a moving object, the dimensions of the zone situated around this center of interest may also be dependent on the forward speed of this moving object. These dimensions may then correspond to a circle centered on the object and having a radius equal to the distance the object may travel in 10 seconds, for example, at the instant its speed of movement is known.

The second image may be displayed on the second display device 21 as a function of the position and orientation of the helmet 20 of the occupant 2. Thus, if the head of the occupant 2 is not oriented towards the center of interest, the center of interest will not be displayed on the second display device 21. An indicator, for example an arrow, may be displayed to indicate to the occupant 2 the direction in which his or head should be oriented in order to be able to see a representation of the center of interest on the second display device 21. The position and the orientation of the helmet 20 worn by the occupant 2 are determined by means of at least one sensor 13 and the tracking device 15 of the aircraft 1.

When the head of the occupant 2 is not oriented towards the center of interest and the center of interest is not displayed on the second display device 21, the occupant 2 can also select a recentering option by means of a suitable selection means, allowing the center of interest to be displayed at the center of the second display device 21 irrespective of the position of the head of the occupant 2. Then, any movement of the head of the occupant 2 modifies the display on the second display device 21 from the centered position of the center of interest, as long as the recentering option is not deactivated, for example using the suitable selection means or another dedicated selection means.

In this case, the second display device 21 may be rendered transparent or semi-transparent in order for the occupant 2 to be able to directly see the landscape outside the aircraft 1, transparently, the second image being visible as an overlay on this landscape outside the aircraft 1.

A representation of the landscape outside the aircraft constructed from the images captured by the image capture devices 12 can be displayed on the second display device 21, which is rendered opaque, if necessary. The second image can then be seen in overlay on this representation of the landscape outside the aircraft 1.

The second image may also be displayed on the second display device 21 regardless of the position and orientation of the helmet 20 of the occupant 2. In this case, the second display device 21 is opaque and the occupant 2 does not distinguish the landscape outside the aircraft 1 through this second display device 21.

The second image may also be displayed in overlay on a representation of the landscape outside the aircraft 1 constructed from the images captured by the image capture devices 12.

Moreover, during movements of the helmet 20, the second image is modified as a function of these movements of the helmet 20 and the changes in position and orientation of the helmet 20. To this end, the step 140 of displaying the second image may comprise a sub-step 147 of determining the position and orientation of the helmet 20 in order to define the amplitudes of these movements of the helmet 20, and a sub-step 148 of calculating a new second image as a function of these movements of the helmet 20 and based on the images of the environment of the aircraft captured by the image capture devices 12.

The second image may be displayed on the second display device 21 in two-dimensions or else in three-dimensions.

In addition, the method according to the disclosure may include a second additional step 145 of displaying information 28 relating to the center of interest and possibly to the zone situated around this center of interest on the second image. This information 28 may be contained in a database stored in a memory of the calculator 19 and/or may be received by the receiving device 17.

Next, a step 150 of displaying a sighting marker 25 on the second image is performed, this sighting marker indicating the center of interest.

When the center of interest selected during the selection step 130 is a single point and constitutes a point of interest, the sighting marker 25 indicates this point of interest. The sighting marker 25 is then situated as the point of interest at the center of the second image, as shown in FIG. 7.

When the selected center of interest is a part of the monitoring zone, the sighting marker 25 indicates a center of this part of the monitoring zone by default during the display step 150.

However, the occupant 2 wearing the helmet 20 can select a point of interest from the part of the monitoring zone during an additional step 142 of selecting a point of interest in this part of the monitoring zone. This selection of a point of interest is carried out by means of the second display device 21 and an auxiliary selection device 23. The sighting marker 25 then indicates this point of interest selected during the additional selection step 142. The sighting marker 25 and the point of interest are then not situated at the center of the second image on the second display device 21, as shown in FIG. 4.

Furthermore, having displayed the sighting marker 25 indicating the center of interest, the sighting marker 25 can be moved on the second image following a movement of the helmet 20. Accordingly, the sighting marker 25 therefore no longer indicates the center of interest on the second image.

In addition, the method according to the disclosure may include additional steps.

The method according to the disclosure may comprise a step 200 of slaving the movable member 50 of the aircraft 1 to the sighting marker 25, then a step 210 of locking the movable member 50 on the sighting marker 25 by means of a locking device 18. The locking device 18 may comprise a push-button arranged on the instrument panel 11 of the aircraft 1.

Thus, before the locking step 210, any change in the position of the sighting marker 25 on the second image is taken into account by the movable member 50. This change in position may follow the additional step 142 of selecting a point of interest in the part of the monitoring zone or a movement of the helmet 2.

Following the locking step 210, such a change in the position of the sighting marker 25 on the second image is not taken into account by the movable member 50.

Following this locking step, a movement of the helmet of the occupant 2 no longer results in movement of the sighting marker 25, which is then directed towards the same point of the environment regardless of the movements of the helmet 20.

Finally, the method according to the disclosure may include a step 220 of activating the movable member 50 towards the locked sighting marker 25. The movable member 50 thus targets the locked sighting marker 25.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure and the claims.

What is claimed is:

1. A method for displaying and managing a situation in an environment of an aircraft, the aircraft comprising image capture devices for capturing images of the environment of the aircraft, at least one calculator, at least one receiving device, at least one first display device arranged inside a cockpit of the aircraft, at least one second display device intended to be positioned at the head of an occupant of the aircraft, at least one sensor arranged inside the aircraft in order to determine a position and an orientation of the head of the occupant with respect to the aircraft, a selection device and a system for tracking the aircraft, the method comprising the following steps:

determining a monitoring zone in the environment of the aircraft, the monitoring zone being a surveillance zone of a region of the external landscape viewed by the occupant of the aircraft, the surveillance region centered on the region of the external landscape viewed by the occupant of the aircraft;

displaying a first image representing the monitoring zone on the first display device;

selecting, on the first display device, a center of interest in the monitoring zone, by means of the selection device;

displaying a second image representing the center of interest on the second display device; and displaying a sighting marker indicating the center of interest on the second image;

wherein the step of determining a monitoring zone in the environment of the aircraft is performed via a zone of the external landscape viewed by the occupant of the aircraft, the viewed zone being determined as a function of the position and orientation of the head of the occupant with respect to the aircraft, the monitoring zone being centered on the viewed zone and having predetermined dimensions;

wherein, during the display step, the second image is constructed from the images of the environment of the aircraft captured by the image capturing devices;

wherein, during the display step, the second image is displayed irrespective of the position and orientation of the head of the occupant.

2. The method according to claim 1, wherein, during the display step, the monitoring zone is displayed on the first display device as an aerial view, wherein the monitoring zone is dynamically defined in real time as a function of the position and orientation of the head of the occupant, such that the monitoring zone remains centered on a region of the actual external landscape viewed by the occupant, independently of graphical elements or selectable objects displayed on the first display device.

3. The method according to claim 1, wherein the monitoring zone is a circle centered on the zone of the external landscape viewed by the occupant of the aircraft and the predetermined dimensions have a radius equal to one meter to several hundred meters.

4. The method according to claim 1, wherein the center of interest is a single point and constitutes a point of interest, the sighting marker indicating the point of interest during the display step.

5. The method according to claim 1, wherein the center of interest is a part of the monitoring zone, the sighting marker indicating a center of the part of the monitoring zone during the display step.

6. The method according to claim 5, wherein, the aircraft including an auxiliary selection device, the method includes an additional step of selecting a point of interest in the part of the monitoring zone by means of the second display device and the auxiliary selection device, the sighting marker indicating the point of interest during the display step.

7. The method according to claim 1, wherein the second image includes a non-distorted central view of a first part of the environment outside the aircraft and a distorted peripheral view of a second part of the environment outside the aircraft, the peripheral view being situated around the central part, the first part of the environment outside the aircraft comprising the center of interest, the second part of the environment outside the aircraft being situated around the first part.

8. The method according to claim 7, wherein the first part and the second part of the environment together cover the whole of the environment around the aircraft, the image capture devices being arranged so as to capture images that together cover the entire external environment in which the aircraft is travelling.

9. The method according to claim 1, wherein, during the display step, the second image is modified as a function of the movements of the head of the occupant.

10. The method according to claim 9, wherein the display step includes the following sub-steps:

determining the position and orientation of the head of the occupant; and calculating a new second image, following a movement of the head of the occupant, as a function of the position and the orientation of the head and based on the images of the environment of the aircraft captured by the image capture devices.

11. The method according to claim 1, wherein the method includes additional steps of displaying information relating to the monitoring zone on the first image and to the center of interest and/or the environment of the center of interest on the second image.

12. The method according to claim 1, wherein, after the step of displaying a sighting marker indicating the center of interest, the sighting marker is moved on the second image following a movement of the head of the occupant, according to the movement of the head.

13. The method according to claim 1, wherein, the aircraft including a movable member, the method includes the following additional steps:

slaving the movable member pointing to the sighting marker;

locking the movable member on the sighting marker by means of a locking device; and activating the movable member towards the locked sighting marker.

14. A system for displaying and managing a situation in the environment of the aircraft, the system comprising image capture devices for capturing images of the environment of the aircraft, at least one calculator, at least one receiving device, at least one first display device arranged inside a cockpit of the aircraft, at least one second display device intended to be positioned at the head of an occupant of the aircraft, at least one sensor arranged inside the aircraft in order to determine a position and an orientation of the head of the occupant with respect to the aircraft and a system for tracking the aircraft, the system comprising a movable member of the aircraft, a selection device and an auxiliary selection device, wherein the system is configured to implement the method according to claim 1.

15. An aircraft, wherein the aircraft comprises the system for displaying and managing a situation in the environment of the aircraft according to claim 14.

16. A method for displaying and managing a situation in an environment of an aircraft, the aircraft comprising image capture devices for capturing images of the environment of the aircraft, at least one calculator, at least one receiving device, at least one first display device arranged inside a cockpit of the aircraft, at least one second display device intended to be positioned at the head of an occupant of the aircraft, at least one sensor arranged inside the aircraft in order to determine a position and an orientation of the head of the occupant with respect to the aircraft, a selection device and a system for tracking the aircraft, the method comprising the following steps:

determining a monitoring zone in the environment of the aircraft via a zone of the external landscape viewed by an occupant of the aircraft and determined as a function of the position and the orientation of the head of the occupant with respect to the aircraft, the monitoring zone being a surveillance zone of a region of the external landscape viewed by the occupant of the aircraft and being centered on the viewed zone, the monitoring zone being centered on the viewed zone and having predetermined dimensions;

displaying a first image representing the monitoring zone on the first display device;

selecting, on the first display device, a center of interest in the monitoring zone, by means of the selection device;

displaying a second image representing the center of interest on the second display device, the second image being constructed from the images of the environment of the aircraft captured by the image capture devices; and displaying a sighting marker indicating the center of interest on the second image;

wherein, during the display step, the second image is displayed irrespective of the position and orientation of the head of the occupant.

17. A method for displaying and managing a situation in an environment of an aircraft, the aircraft comprising image capture devices for capturing images of the environment of the aircraft, at least one calculator, at least one receiving device, a first display inside a cockpit of the aircraft, a second display device intended to be positioned at the head of an occupant of the aircraft, a sensor inside the aircraft to determine a position and an orientation of the head of the occupant with respect to the aircraft, a selection device and a system for tracking the aircraft, the method comprising:

determining a monitoring zone in the environment of the aircraft, the monitoring zone being a surveillance zone of a region of the external landscape viewed by the occupant of the aircraft, the surveillance region centered on the region of the external landscape viewed by the occupant of the aircraft, the monitoring zone being centered on the viewed zone and having predetermined dimensions;

displaying a first image representing the monitoring zone on the first display;

selecting, on the first display, a center of interest in the monitoring zone, by the selection device;

displaying a second image representing the center of interest on the second display; and displaying a sighting marker indicating the center of interest on the second image;

wherein the step of determining a monitoring zone in the environment of the aircraft is performed:

by a selection by an occupant of the aircraft by a selection device on the first display, the first display displaying an image representing the environment of the aircraft in the form of an aerial view; or by receiving the coordinates of the monitoring zone via a receiver;

wherein, during the display step, the second image is constructed from the images of the environment of the aircraft captured by the image capturing devices;

wherein, during the display step, the second image is displayed irrespective of the position and orientation of the head of the occupant, wherein the first display displays a first image limited to the monitoring zone, and wherein the second display displays a second image limited to the center of interest and a zone surrounding the center of interest.

18. The method according to claim 17, wherein, during the display step, the monitoring zone is displayed on the first display device as an aerial view, and wherein the predetermined dimensions has a radius of at least 100 meters.

19. The method according to claim 17, wherein the center of interest is a single point and constitutes a point of interest, the sighting marker indicating the point of interest during the display step.

20. The method according to claim 17, wherein the second display device is opaque.

* * * * *